Dec. 2, 1941.                W. P. POWERS                2,264,640
                             TURN INDICATOR
                          Filed June 20, 1941          3 Sheets-Sheet 1

Walter P. Powers,
                INVENTOR.

BY
                ATTORNEY.

Dec. 2, 1941.   W. P. POWERS   2,264,640
TURN INDICATOR
Filed June 20, 1941   3 Sheets-Sheet 2

Walter P. Powers,
INVENTOR.
BY
ATTORNEY.

Dec. 2, 1941.  W. P. POWERS  2,264,640
TURN INDICATOR
Filed June 20, 1941  3 Sheets—Sheet 3

Walter P. Powers,
INVENTOR.
BY
ATTORNEY.

Patented Dec. 2, 1941

2,264,640

UNITED STATES PATENT OFFICE 2,264,640

TURN INDICATOR

Walter P. Powers, East Orange, N. J., assignor to Associated Patentees, Inc., Ampere, N. J., a corporation of New Jersey Application June 20, 1941, Serial No. 398,891

10 Claims. (Cl. 116—129)

The invention here disclosed relates particularly though not exclusively to instruments in the nature of rate of turn indicators.

A characteristic of turn indicators now in use is that for what may be considered a more or less normal rate of turn, the indicator will show only a small angular deflection, making it a difficult matter to read any small deviations from that angle and requiring very close attention on the part of the pilot to maintain the craft at that particular rate of turn.

Thus in making a standard procedure or so-called "needle width" turn, that is, at the rate of 3° per second or 180° per minute, the needle or pointer of the usual turn indicator will show a deflection of only approximately its own width and to complete the turn accurately, it is necessary for the pilot to maintain the pointer in that exact position.

Special objects of the present invention are to provide a rate of turn indicator, which will give the pilot a more easily read indication and which will enable the pilot to hold more closely to a desired rate of turn.

Further objects are to provide the improvements mentioned in a form readily applicable to existing instruments of accepted and more or less standardized construction.

Other desirable objects and the novel features through which the purposes of the invention are attained will appear or are set forth in the following specification.

In the drawings, the invention is shown embodied in a form of turn and bank indicator. Actual structure and the uses to which the invention are put may be varied and changed all within the true intent and broad scope of the invention, as will be clear from the following specification and claims:

Figure 1:
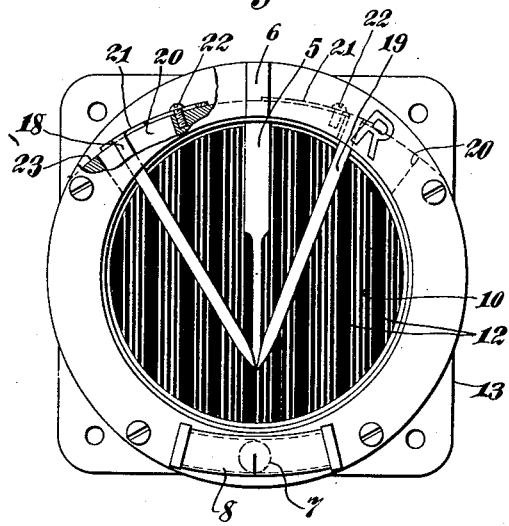
Fig. 1 is a front elevation of a turn and bank indicator form of the invention, shown in the neutral or no-turn position.

In the several forms of the instrument illustrated, the standard and generally understood features are incorporated, of a gyroscopically controlled pointer 5, mounted to swing with respect to an index 6, and a ball 7, positioned according to the pull of gravity and centrifugal forces, in a curved tube 8.

The pointer in Figs. 1 to 5, is shown as carried by a disc 9, and the reason for this is that there is arranged to move with the pointer, a grid 10, and the disc provides a convenient carrier for both the pointer and the grid.

The movable grid cooperates with a stationary grid 11, lined in vernier relation to form one or a number of shadow pointers 12.

Figure 3:
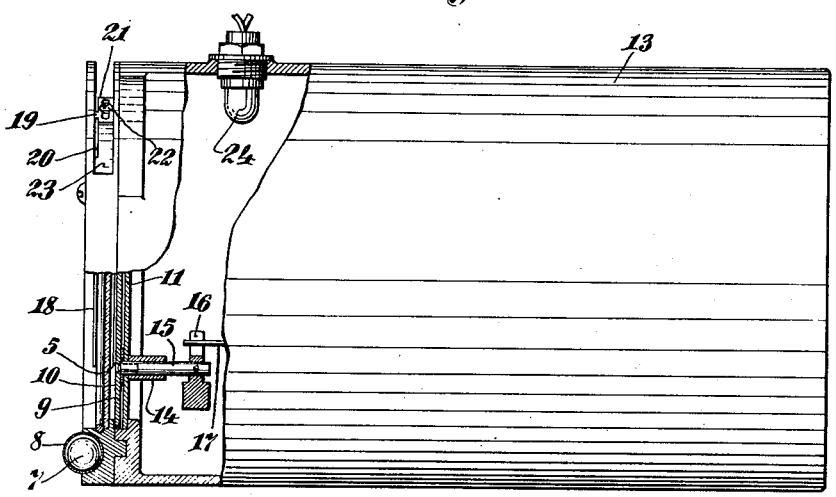
Fig. 3 is a broken and part longitudinal sectional view of the instrument.

The sectional view, Fig. 3, shows how the stationary grid may be fixedly mounted in the casing 13, of the instrument and serve as a support for the movable grid, by carrying a bearing 14, for the spindle 15, on which the movable grid is mounted. This spindle is shown as having a fork 16, engageable by the pin 17, of the precessional frame of the gyroscope.

The grids are shown as made up each of substantially parallel lines or bars, spaced substantially their width apart and with the lines and spaces of one grid so related to the spaces and lines of the other grid as to partially or wholly register at recurring intervals, thus by obscuration to form the pointers 12, extending the full length of the overlapping portions of the grids.

The result is that for a slight and comparatively slow movement of the regular pointer 5, the shadow pointer or pointers 12, will swing through a greater angle and with a quicker movement, providing thus in effect an amplified or exaggerated indication.

In the case of the timed or needle width turn illustrated, with the pointer displaced through an angle of only its own width, in corner-to-corner relation to the neutral mark, the more sensitive and faster moving auxiliary pointers may reach out to an angle of some 40° or so, easily readable by the pilot without close attention and easy to follow as to any variations in rate of turn.

To provide the pilot with standards or references to be maintained, in the making of procedure turns, for example, the instrument is shown as having marker bars 18, 19, which can be set to the proper angles for left and right procedure turns.

These markers may be mounted in various ways for adjustment about the center of pointer movement, for instance, as here shown by extending them through slots 20, in the bezel of the instrument and by providing them with curved supports 21, at the outer ends slotted for the screws 22, which secure them over the curved bearings 23, formed as arcs based on the operating center.

The turn references or indexes are adjustable independently to allow for variations or peculiarities characteristics to different craft, in turning in one direction or the other. These can be set by the pilot in properly timed test turns and secured in the positions to thereafter serve as the proper references for making procedure turns or carrying out other particular evolutions.

The usual arrangement is such that the shadow pointer or pointers will swing in the same direction as the regular pointer although if desired, the more sensitive, shadow pointer may be made to swing in the opposite direction, this being determined by relative location of the grids. In the illustration, the grid of finer and more closely spaced lines is the movable grid and this is located in front of the stationary grid of coarser mesh to effect movement of the shadow pointers in the same direction as the regular turn indicating pointer.

The instrument may be suitably illuminated. In the example, this is effected by a small lamp 24, set in the top of the instrument case back of the stationary screen. Other forms of lighting, such as indirect or edge lighting, may be employed and the method of illumination may be varied to suit the nature of the grids. In some instances, the grids may be formed by slitting solid opaque sheet material, such a structural combination requiring direct illumination from in back or the like. In other instances, such as here indicated, the grids may be formed by opaque bars, painted, printed, photographically or otherwise produced, on transparent sheet material.

While particularly intended for indicating or designating purposes, it is realized that the invention may be applied to control purposes, for example, by providing photo-electric cells or the like, which would be affected by the sensitive shadow pointer or pointers to govern or control other parts, such as the controls employed for maintaining a craft in desired flight.

Figure 2:
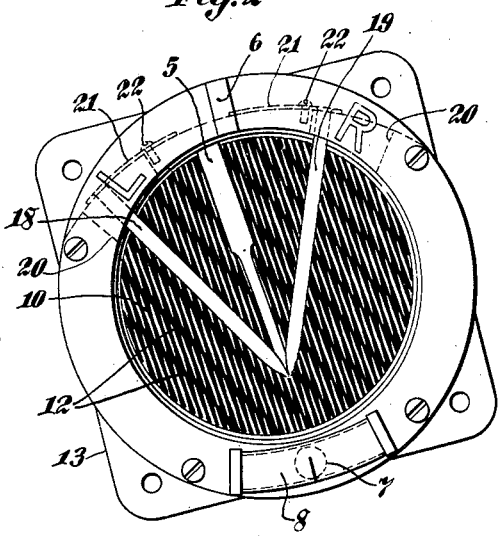
Fig. 2 is a similar view showing the instrument as it appears in a procedure turn, with the regular pointer "off" only one width, but with the extra or more sensitive shadow pointer or pointers "off" of a much greater angular distance and in register or parallel with a special reference marker, which has been set at the angle indicating the procedure turn.
Figure 4:
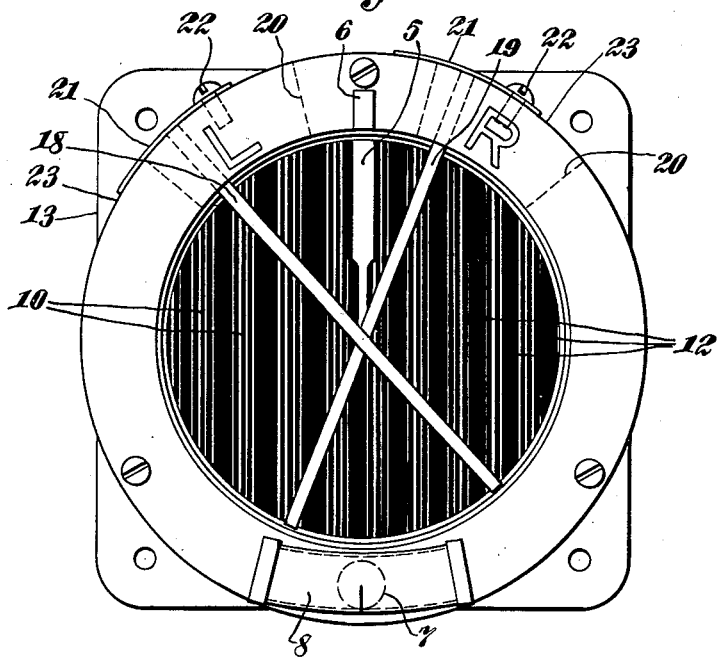
Figs. 4 and 5 are face views of a modified form of the invention, showing it in the straight ahead and in the left procedure turn positions.
Figure 5:
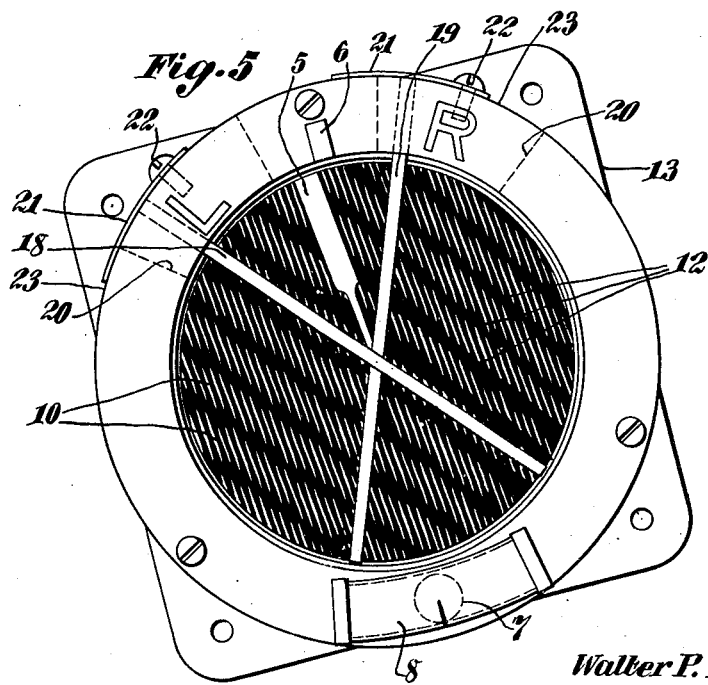

In Figs. 1, 2 and 3, the pointer is shown arranged to swing on a center below the center of the dial, as usual in turn indicators, but if desired, to keep the pointer and the movable grid disc which carries the pointer, in balanced condition, the spindle carrying the movable disc may be located centrally of the instrument as illustrated in Figs. 4 and 5.

Figure 6:
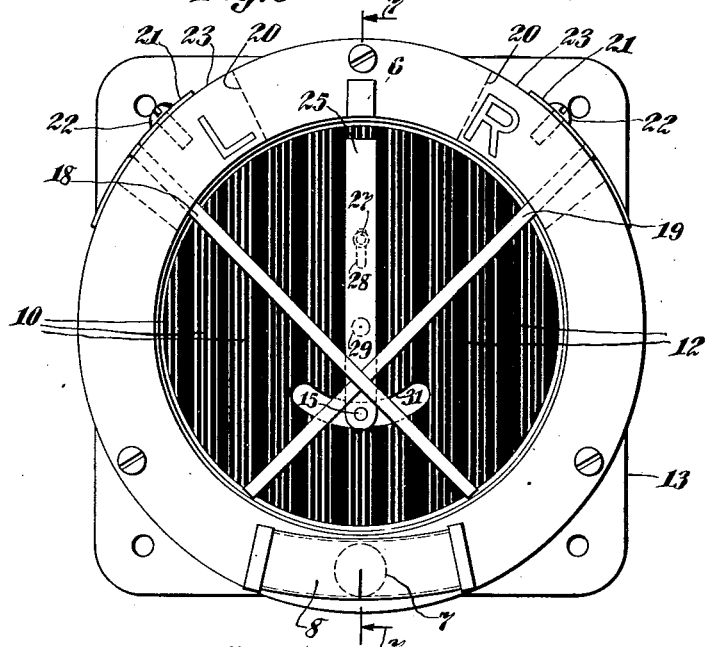
Fig. 6 is a front view and Fig. 7 is a broken part sectional side elevation of another form of the invention.
Figure 7:
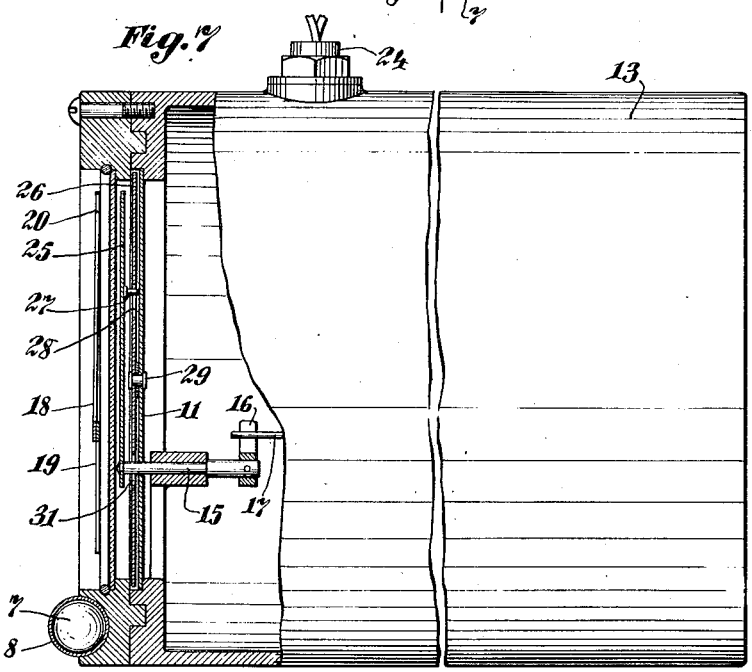

In the form of the invention shown in Figs. 6 and 7, the usual form of pointer construction is retained, as indicated at 25, and the motion of the pointer is transmitted to the movable grid disc 26, by a pin 27, on the back of the pointer extending into a radial slot 28, in said disc. In this case, the movable disc is shown rotatably supported on a pivot stud 29, projecting from the center of the fixed grid disc 11. The movable disc is shown slotted at 31, for passage of the pointer spindle 15 therethrough.

What is claimed is:

1. A rate of turn indicator, comprising in combination with a turn controlled rotatable pointer and associated index, a flat grid of substantially parallel equally spaced lines mounted to travel with said pointer and a relatively stationary flat grid of substantially parallel spaced lines associated in overlapping parallel vernier relation with said first movable grid and producing by obscuration in cooperation therewith a shadow pointer or pointers extending at various inclines across the field of overlap of the two grids and having greater amplitude of movement than said first mentioned pointer.

2. A rate of turn indicator, comprising mechanism sensitive to rate of turn, flat grids disposed one in front of the other in parallel relation and consisting each of equally spaced parallel bars and the spaced bars of one grid being of different pitch than those of the other to cooperatively produce a shadow pointer or pointers extending at various inclines across the field of overlap of the grids, said grids being mounted for relative pivotal movement and connections from said rate of turn sensitive mechanism for effecting relative pivotal movement of said grids according to changes in rate of turn.

3. A rate of turn instrument, comprising turn sensitive mechanism, a rotatably mounted disc operated by said turn sensitive mechanism, a pointer carried by said disc, a grid of substantially parallel lines carried by said disc and a parallel grid of substantially parallel lines mounted in relatively stationary relation at one side of said disc carried grid, the parallel lines of each grid being equally spaced but the lines of the two grids being in vernier relation to thereby create shadow pointers shiftable about the center of movement into various inclined relations, across the field of overlap of the two grids.

4. A rate of turn instrument, comprising turn sensitive mechanism, a rotatably mounted disc operated by said turn sensitive mechanism, a pointer carried by said disc, a grid of substantially parallel lines carried by said disc, a parallel grid of substantially parallel lines mounted in relatively stationary relation at one side of said disc carried grid and means for effecting illumination of said grids, the parallel lines of each grid being equally spaced but the lines of the two grids being in vernier relation to thereby create shadow pointers shiftable about the center of movement into various inclined relations, across the field of overlap of the two grids.

5. A rate of turn instrument, comprising turn sensitive mechanism, a rotatably mounted disc operated by said turn sensitive mechanism, a pointer carried by said disc, a grid of substantially parallel lines carried by said disc, a parallel grid of substantially parallel lines mounted in relatively stationary relation at one side of said disc carried grid and left and right turn indexes adjustably mounted over said grids, the parallel lines of each grid being equally spaced but the lines of the two grids being in vernier relation to thereby create shadow pointers shiftable about the center of movement into various inclined relations, across the field of overlap of the two grids.

6. A rate of turn indicator, comprising in combination with a swinging pointer sensitive to rate of turn and an index therefor, a flat grid of substantially parallel lines pivotally mounted to swing about the center of movement of said swinging pointer and movable with said pointer, a relatively stationary flat grid of substantially parallel lines in parallel vernier relation to said movable grid and forming therewith by obscuration a shadow pointer having movement in excess of said actual pointer, the parallel lines of each grid being equally spaced and the lines of the two grids being in vernier relation.

7. A rate of turn indicator, comprising in combination with a rotatable pointer sensitive to rate of turn and an index therefor, a flat grid of substantially parallel lines movable with said pointer, a relatively stat'onary flat grid of substantially parallel lines in parallel vernier relation to said movable grid and forming therewith by obscuration a shadow pointer having movement in excess of said actual pointer, the parallel lines of each grid being equally spaced and the lines of the two grids being in vernier relation and a standard adjustably mounted in respect to said grids to form a reference for said shadow pointer.

8. A rate of turn indicator, comprising in combination with a rotatable pointer sensitive to rate of turn and an index therefor, a flat grid of substantially parallel lines movable with said pointer, a relatively stationary flat grid of substantially parallel lines in parallel vernier relation to said movable grid and forming therewith by obscuration a shadow pointer having movement in excess of said actual pointer, the parallel lines of each grid being equally spaced and the lines of the two grids being in vernier relation and right and left turn references adjustably mounted in respect to said grids to serve as references for said shadow pointer.

9. In combination, means sensitive to turn, a rotatably mounted flat grid of equally spaced substantially parallel lines shiftable by said turn sensitive means, a flat grid of slightly differently equally spaced parallel lines in parallel vernier relation to said rotatably mounted grid and turn references angularly adjustable about the center of support of said rotatably mounted grid.

10. In an instrument of the character disclosed, the combination of a rotatably movable pointer, relatively fixed and pivoted flat parallel grids located to one side of said pointer and standing one in front of the other and a drive connection between said movable pointer and the rotatably mounted grid, said grids composed each of equally spaced parallel lines and the lines of one grid spaced differently from the lines of the other grid.

WALTER P. POWERS.